Oct. 27, 1953 — J. H. RICHA — 2,656,642
LOBSTER AND CRAB CATCHER
Filed Aug. 18, 1951 — 2 Sheets-Sheet 1

INVENTOR.
BY John H. Richa
Fishburn + Mullendore
ATTORNEYS.

Oct. 27, 1953 J. H. RICHA 2,656,642
LOBSTER AND CRAB CATCHER
Filed Aug. 18, 1951 2 Sheets-Sheet 2

INVENTOR.
John H. Richa
BY Fishburn + Mullendore
ATTORNEYS.

Patented Oct. 27, 1953

2,656,642

UNITED STATES PATENT OFFICE 2,656,642

LOBSTER AND CRAB CATCHER

John H. Richa, Kansas City, Mo.

Application August 18, 1951, Serial No. 242,457

8 Claims. (Cl. 43—100)

This invention relates to catchers for lobster, crabs and other crustaceans and like forms of arthropods, and more particularly to a catcher which may be conveniently manipulated to grip crustaceans and the like for drawing same from the water.

The principal objects of the invention are to provide a crustacean catcher having a plurality of gripping members or jaws actuated by a bait carrying line, whereby when the crustacean is nibbling on the bait the fisherman by drawing on the line actuates the grippers or jaws to engage and hold the crustacean while it and the catcher are drawn to the surface of the water; to provide a plurality of teeth or points on the gripping members or jaws to facilitate retention of the crustacean in the catcher; and to provide a simple, efficient catcher structure which is economical to manufacture, that is actuated by a single line that also carries the bait.

In accomplishing these and other objects of the present invention, I have provided improved details of structure, the preferred forms of which are illustrated in the accompanying drawings, wherein.

Figure 1:
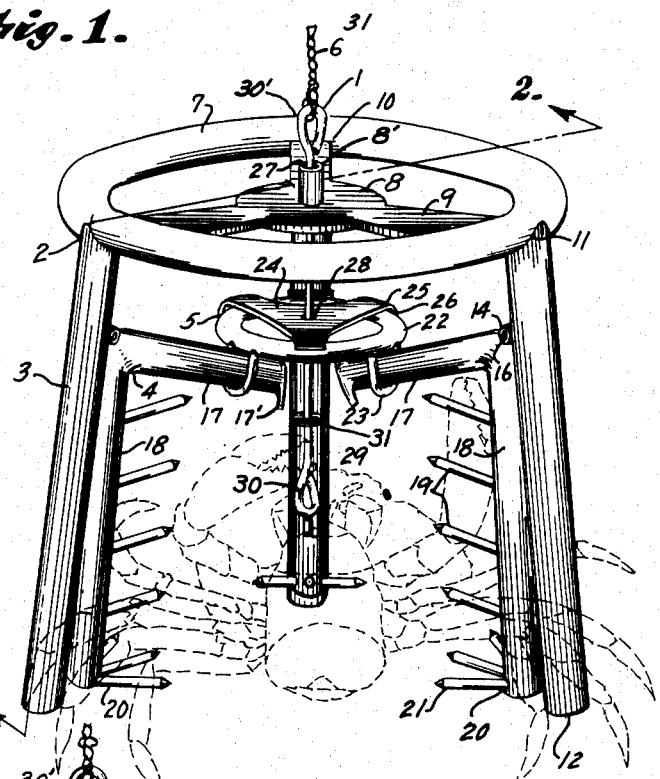
Fig. 1 is a perspective view of the crustacean catcher, a crustacean being shown in dotted lines in position to take the bait.

Referring more in detail to the drawings:

1 designates a crustacean catcher generally consisting of a frame 2 including a plurality of spaced legs 3, and carrying a plurality of grippers or jaws 4 which are hingedly mounted and adapted to be moved into crab gripping position by a spider 5 actuated in response to movement of a cord or wire line 6, said line being connected to the hand of the fisherman in the usual manner.

The various portions of the catcher are preferably formed of metal or other suitable material, said metal being of such shape as to be easily constructed and assembled. The principal portions of the catcher are illustrated as being formed of tubes and sheet metal, however, the illustrated form is merely exemplary as the various parts may be cast or fabricated from bent sheets and structural members.

The frame 2 preferably includes a circular ring 7. A disk-like member 8 is centrally located in the ring and has an upwardly extending sleeve 8' axially thereof. The disk-like member 8 also has a plurality of radial members 9, the outer ends of which are suitably secured as at 10 to the ring. The legs 3, illustrated to be three in number, are equally spaced around the ring and suitably secured thereto as at 11, the legs sloping outwardly to provide greater spacing at the lower ends 12 thereof. The lower ends of the legs are preferably closed as at 13 to provide adequate supporting area for engagement with a bottom or floor of the area to be fished.

The grippers or jaws are hingedly mounted on the frame or legs thereof. In the illustrated structure, spaced ears 14 are suitably secured as by welding to the legs 3 below the ring 7 and disk member 8, sufficiently to provide room for movement of the spider 5 in the operation of the catcher. The grippers or jaws 4 have ears 15 thereon adapted to be positioned between the ears 14, the ears 14 and 15 having aligning bores for receiving pins 16 to provide hinges or pivot connections of the grippers on the frame. The grippers or jaws 4 are illustrated as being tubular and include arms 17 extending inwardly from the hinge connection toward the center of the catcher, said arms 17 having lugs 17' preferably extending downwardly adjacent the inner ends thereof. Said grippers also include depending members 18 extending downwardly adjacent each leg, said depending member being provided with a plurality of vertically spaced teeth or points 19 which preferably extend inwardly toward the center of the catcher and slope slightly upwardly. A claw arrangement 20 is provided adjacent the lower end of the depending members 18, said claw arrangement being illustrated as consisting of a plurality of spaced, diverging teeth 21, which are preferably substantially in a horizontal plane when the grippers are in open position. The teeth 19 are preferably progressively longer from the lower end toward the upper end of the jaws.

The spider 5 preferably comprises a ring 22 having a plurality of spaced depending loops 23 forming apertures for slidably receiving the inner ends of arms 17. The ring 22 and loops 23 thereon are preferably of such size and so arranged that lateral movement of the spider 5 will normally not permit disengagement of the loops from the arms 17, however, the lugs 17' form positive stops to prevent such disengagement. The spider 5 includes a flat member 24 centrally arranged relative to the ring 22 and provided with fingers 25 extending over and suitably secured as at 26 to the ring 22. The upwardly extending sleeve 8' on the disk member 8 has a bore 27 and the flat member 24 has an aligning aperture, said bore 27 and aperture 28 preferably being at the vertical center or axis of the catcher for slidably receiving a rod 29 which has a loop 30 on the lower end and a loop 30' on the upper end thereof. The lower end of the line is connected to the upper loop and the lower loop forms a bait holder. A disk-like member or stop 31 is secured to the rod between the spider 5 and the lower loop or bait holder 30.

Figure 4:
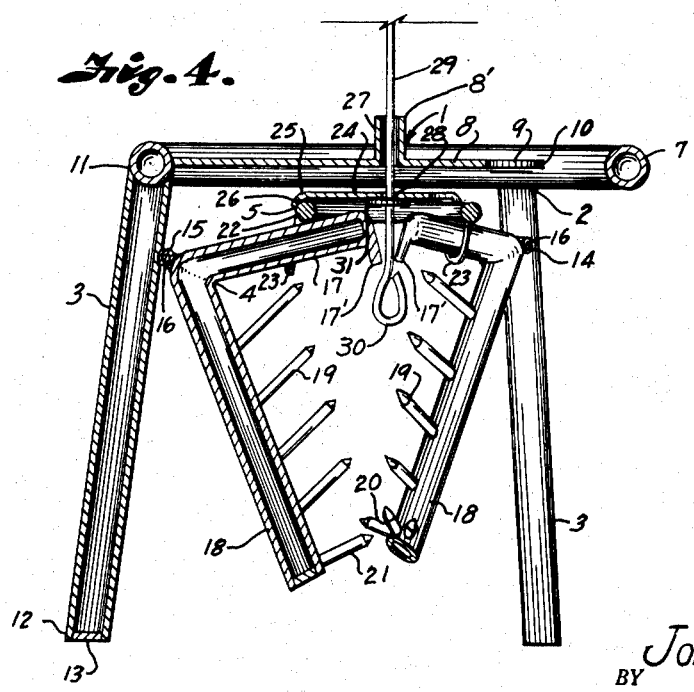
Fig. 4 is a vertical sectional view through the catcher on the line 4—4, Fig. 3.

The disk-like member or stop 31 is larger than the aperture 28 and is so spaced from the upper loop 30' that when the said upper loop is resting on the upper end of the sleeve 8', the bait holder will be slightly lower than desired position relative to the lower ends of the legs 3 whereby the fisherman may raise the line to disengage the upper loop from the sleeve and provide proper spacing between the bait and the bottom or floor of the area being fished. This allows the fisherman to feel a crustacean nibbling on the bait and upon the fisherman's drawing the line upwardly, the disk-like member or stop 31 will engage the lower surface of the flat member 24 to effect upward movement of the spider 5 whereby the loops 23 will swing the arms 17 upwardly, thereby swinging the depending members 18 and the teeth thereon inwardly toward the center of the catcher, as illustrated in Fig. 4.

Figure 2:
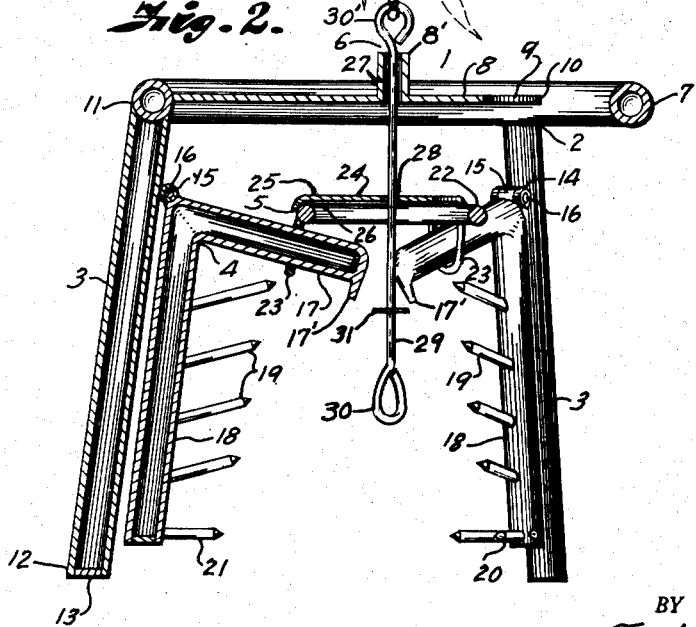
Fig. 2 is a vertical sectional view through the catcher on the line 2—2, Fig. 1.
Figure 3:
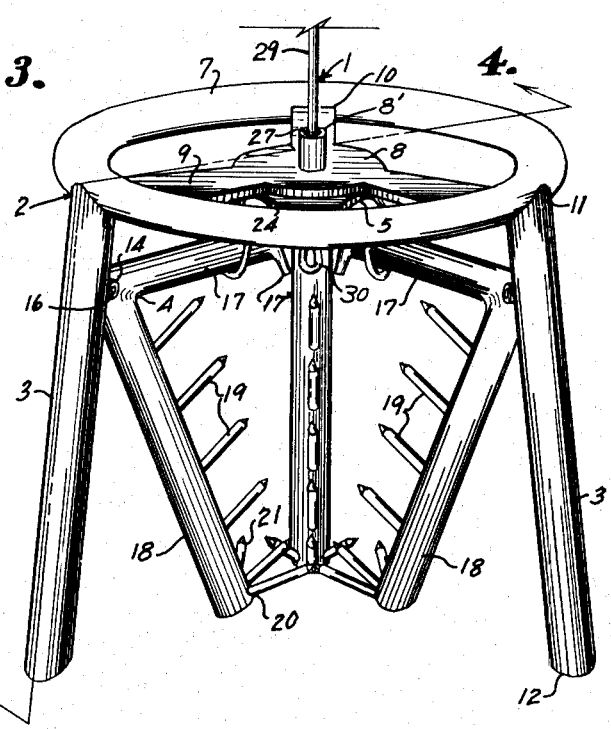
Fig. 3 is a perspective view of the catcher with the gripping members moved to crustacean engaging position.

In using a crustacean catcher constructed and assembled as described, bait is applied to the lower loop or bait holder 30 and then the catcher lowered over the side of a boat, pier or the like into the water to be fished. During the lowering movement, the jaws will be in the position illustrated in Fig. 4. When the lower ends of the legs 3 rest on the bottom of the area to be fished, continued lowering of the line 6 will cause the weight of the spider 5 to be applied to the arms 17 to swing the grippers or jaws outwardly whereby the depending members 18 lie adjacent the legs 3, as illustrated in Fig. 2. It is preferable that the line 6 be further lowered until the upper loop of the rod 29 rests on the upper end of the sleeve 8', and then raised slightly. This will provide proper position of the bait and yet allow the line to be supported direct from the hand of the fisherman whereby the instant a crab, lobster or other crustacean is nibbling at the bait, the fisherman can immediately draw the line 6 upwardly whereby the stop 31 will lift the spider 5 and swing the jaws inwardly into gripping engagement with the crustacean, holding same while it is drawn from the water and deposited in the boat or other support for the fisherman.

What I claim and desire to secure by Letters Patent is:

1. A crustacean catcher comprising, a frame including a plurality of spaced legs adapted to rest on the bottom of an area to be fished and the spaced legs providing a plurality of openings for entrance of crustaceans, a plurality of jaws hingedly mounted on the frame between said legs and the center of the catcher for swinging movement toward the center of the catcher, actuating means engaging the jaws for effecting swinging movement thereof, vertically movable means extending through the center of the frame and having a bait carrying device on the lower end thereof, means on said vertically movable means engageable with the frame for limiting downward movement of the bait holder, and means on said vertically movable means engageable with the actuating means for effecting swinging movement of the jaws in response to upward movement of the vertically movable means, said means on the vertically movable means engageable with the frame for limiting downward movement of the bait holder and the means on the vertically movable means engageable with the actuating means being spaced so that they may be out of engagement when the frame is resting on the bottom of the area, whereby the crustacean attacking the bait will cause movement on the vertically movable means detectable by the user holding the line.

2. A crustacean catcher comprising, a frame including a plurality of spaced legs adapted to rest on the bottom of an area to be fished and the spaced legs providing a plurality of openings for entrance of crustaceans, a plurality of jaws hingedly mounted on the frame for swinging movement toward the center of the catcher, a spider, means on the spider engaging the jaws for effecting swinging movement thereof in response to movement of the spider, said spider having sufficient weight to act on the jaws to swing the same outwardly when the legs are resting on the bottom of the area, a line, means on the line extending through the center of the frame and having a bait carrying device thereon within the frame, means engageable with the frame for limiting downward movement of the line to position the bait holder, and means engageable with the spider for effecting movement thereof and swinging movement of the jaws in response to upward movement of the line, said means engageable with the frame and the said means engageable with the spider being spaced so that they may be out of engagement when the frame is resting on the bottom of the area, whereby the crustacean attacking the bait will cause movement on the line detectable by the user holding the line.

3. A crustacean catcher comprising, a frame including a plurality of spaced legs, said legs being adapted to rest on the bottom of an area to be fished and the spaced legs defining openings for entrance of crustaceans, a plurality of jaws hingedly mounted on the frame between said legs and the center of the catcher for swinging movement toward the center of the catcher, a spider, means on the spider engaging the jaws for effecting swinging movement thereof in response to vertical movement of the spider, vertically movable means extending through the center of the frame and spider and having a bait carrying device on the lower end thereof, means on the vertically movable means engageable with the frame for limiting downward movement of the lowermost position of the bait holder, and means on the vertically movable means engageable with the spider for effecting vertical movement thereof and for effecting swinging movement of the jaws in response to upward movement of the vertically movable means.

4. A crustacean catcher comprising, a frame including a plurality of spaced depending legs, said legs being adapted to rest on the bottom of an area to be fished and the spaced legs defining openings for entrance of crustaceans, a plurality of arms hingedly mounted on the frame and extending toward the vertical center thereof, depending jaws on the arms, said jaws being adjacent the legs when the catcher is in open position, a spider, means on the spider loosely and slidably engaging the arms for moving same, said spider and frame having aligned centrally located apertures, vertically movable means extending through the apertures in the frame and spider, a bait holder on the lower end of the vertically movable means, means on the vertically movable means above the frame for engaging said frame to position the bait holder, and means on the vertically movable means between the spider and bait holder and engageable with the spider in response to upward movement of the vertically movable means for effecting movement of the spider and swinging of the depending jaws into gripping engagement with a crustacean attacking the bait.

5. A crustacean catcher comprising, a frame including a plurality of spaced depending legs, said legs being adapted to rest on the bottom of an area to be fished and the spaced legs defining openings for entrance of crustaceans, a plurality of arms hingedly mounted on the frame and extending toward the vertical center thereof, depending members on the arms, a plurality of vertically spaced teeth on the depending members and extending toward the center of the catcher, said depending members being adjacent the legs when the catcher is in open position, a spider, depending loop members on the spider loosely and slidably engaging the arms, said spider and frame having aligned centrally located apertures, a line, a rod on the line and extending through the apertures in the frame and spider, a bait holder on the lower end of the rod, means on the rod above the frame for engaging said frame to position the bait holder, and means on the rod between the spider and bait holder and engageable with the spider in response to upward movement of the line for effecting movement of the spider and swinging of the depending members into gripping engagement with a crustacean attacking the bait, said means on the rod above the frame and the means on the rod between the spider and bait holder being spaced so as to be out of engagement with the frame and spider when the frame is resting on the bottom of the area, whereby the crustacean attacking the bait will cause movement on the line detectable by the user holding the line.

6. A crustacean catcher comprising, a ringlike member, a sleeve member centrally located in the ring-like member and supported thereby, a plurality of legs on the ring member and depending therefrom, jaw members adjacent the respective leg members, said jaw members being hingedly mounted adjacent the upper ends of the respective leg members in spaced relation to the ring member, arms on the jaw members extending inwardly toward the vertical center of the catcher, a spider, means on the spider loosely and slidably engaging the arms for moving same, said spider and sleeve member having aligned apertures, a line, a rod on the line and extending through the apertures and the sleeve member and spider, a bait holder on the lower end of the rod, means on the rod above the sleeve member and engageable therewith to position the bait holder, and means on the rod between the bait holder and spider and for engaging the spider and effecting vertical movement thereof and inwardly swinging movement of the jaws in response to vertical movement of the line.

7. A crustacean catcher comprising, a ring member, a sleeve member centrally located in the ring member and supported thereby, a plurality of legs on the ring member and depending therefrom, jaw members adjacent the respective leg members, said jaw members being hingedly mounted adjacent the upper ends on the respective leg members in spaced relation to the ring member, a plurality of teeth on the jaw members and extending inwardly toward the vertical center of the catcher, arms at the upper ends of the jaw members extending inwardly toward the vertical center of the catcher, a spider, depending loop members on the spider loosely and slidably engaging the arms, said spider and said sleeve member having aligned apertures, a line, a rod on the line and extending through the apertures and the sleeve member and spider, a bait holder on the lower end of the rod, means on the rod above the sleeve member and engageable therewith to position the bait holder, and means on the rod between the bait holder and spider for engaging the spider and effecting vertical movement thereof, to produce inwardly swinging movement of the jaw members in response to vertical movement of the line.

8. A crustacean catcher comprising, a frame including a plurality of spaced depending legs, said legs being adapted to rest on the bottom of the area to be fished and the spaced legs defining openings for entrance of crustaceans, a plurality of arms hingedly mounted on the frame and extending toward the vertical center thereof, depending jaws on the arms, said jaws being adjacent the legs when the catcher is in open position, a spider, means on the spider loosely and slidably engaging the arms for moving same, said spider and frame having aligned centrally located apertures, vertically movable means extending through the apertures in the frame and spider, a bait holder on the lower end of the vertically movable means, means on the vertically movable means above the frame for engaging said frame to position the bait holder, and means on the vertically movable means between the spider and bait holder and engageable with the spider in response to upward movement of the vertically movable means for effecting movement of the spider and swinging of the depending jaws into gripping engagement with a crustacean attacking the bait, said spider being spaced from the top of the frame whereby tension of the crustacean on the jaws will be directly imparted to the vertically movable means, said spider having sufficient weight to act on the arms to swing the jaws outwardly when the legs are resting on the bottom of the area.

JOHN H. RICHA.

References Cited in the file of this patent

UNITED STATES PATENTS

| Number | Name | Date |
|---|---|---|
| 594,906 | Schindler | Dec. 7, 1897 |
| 1,171,440 | Immell | Feb. 15, 1916 |
| 1,510,176 | Knight | Sept. 30, 1924 |
| 2,087,877 | Ralston et al. | July 20, 1937 |